United States Patent
Lee et al.

(10) Patent No.: US 11,098,610 B2
(45) Date of Patent: Aug. 24, 2021

(54) STEAM TURBINE SEAL PACKING PERFORMANCE MONITORING SYSTEM USING MAGNETIC FIELD COMMUNICATION

(71) Applicant: DOOSAN HEAVY INDUSTRIES & CONSTRUCTION CO., LTD., Changwon-si (KR)

(72) Inventors: Seung Chul Lee, Seoul (KR); Jong Min Choi, Yongin-si (KR); Hyun Woo Son, Yongin-si (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 303 days.

(21) Appl. No.: 16/265,968

(22) Filed: Feb. 1, 2019

(65) Prior Publication Data

US 2019/0264577 A1    Aug. 29, 2019

(30) Foreign Application Priority Data

Feb. 26, 2018  (KR) .......................... 10-2018-0022593

(51) Int. Cl.
    *F01D 21/00*      (2006.01)
    *G01M 3/28*       (2006.01)
    (Continued)

(52) U.S. Cl.
    CPC .......... *F01D 21/003* (2013.01); *F01D 11/003* (2013.01); *G01M 3/2869* (2013.01); *G01M 15/02* (2013.01)

(58) Field of Classification Search
    CPC ...... F01D 21/003; F01D 11/003; F01D 17/08; F01D 11/02; G01M 3/2869; G01M 15/02;
    (Continued)

(56) References Cited

U.S. PATENT DOCUMENTS 4,715,213 A * 12/1987 McGreehan ............ G01M 3/20
                                                    277/320
6,132,168 A * 10/2000 Kovaleski ............. F01D 11/001
                                                    415/107
(Continued)

FOREIGN PATENT DOCUMENTS

JP        2013-144967 A       7/2013
KR    10-2002-0070704 A       9/2002

OTHER PUBLICATIONS

A Korean Office Action dated Apr. 9, 2019 in connection with Korean Patent Application No. 10-2018-0022593 which corresponds to the above-referenced U.S. application.

*Primary Examiner* — Freddie Kirkland, III
(74) *Attorney, Agent, or Firm* — Invenstone Patent, LLC

(57) ABSTRACT

In a steam turbine seal packing performance monitoring system, steam pressure is measured by installing a pressure sensor inside a seal packing for preventing steam from leaking, so that pressure information can be transmitted using magnetic field communication in order to externally monitor seal packing performance. The system includes a seal packing unit that is installed on a rotor shaft and has a plurality of seal packs disposed along an axial direction of the rotor shaft; a pressure sensor installed inside the seal packing unit to detect a pressure of steam leaked from inside the seal packing unit and to transmit a magnetic field signal by converting a detection signal indicative of the detected pressure into the magnetic field signal; and an adapter for receiving the magnetic field signal, converting the received magnetic field signal into pressure data, and calculating a leakage amount of steam based on the pressure data.

20 Claims, 5 Drawing Sheets

(51) Int. Cl.
 *G01M 15/02* (2006.01)
 *F01D 11/00* (2006.01)
(58) Field of Classification Search
 CPC ........... F05D 2270/301; F05D 2240/55; F05D 2220/31; G06Q 50/10
 See application file for complete search history.

(56) References Cited

U.S. PATENT DOCUMENTS

| | | | | |
|---|---|---|---|---|
| 8,864,442 | B2* | 10/2014 | Tomaso | F01D 17/02 |
| | | | | 415/112 |
| 8,864,443 | B2* | 10/2014 | Narita | F16J 15/442 |
| | | | | 415/113 |
| 9,032,733 | B2* | 5/2015 | Dalsania | F01K 13/02 |
| | | | | 60/646 |
| 9,645,038 | B2* | 5/2017 | Bird | F01D 11/02 |
| 10,746,591 | B2* | 8/2020 | Choi | H04B 5/0031 |
| 2009/0142187 | A1* | 6/2009 | Narita | F16J 15/445 |
| | | | | 415/173.1 |
| 2014/0298808 | A1* | 10/2014 | Dalsania | F01K 17/06 |
| | | | | 60/643 |
| 2016/0373837 | A1* | 12/2016 | Sobanski | H04Q 1/116 |

* cited by examiner

[FIG. 1]
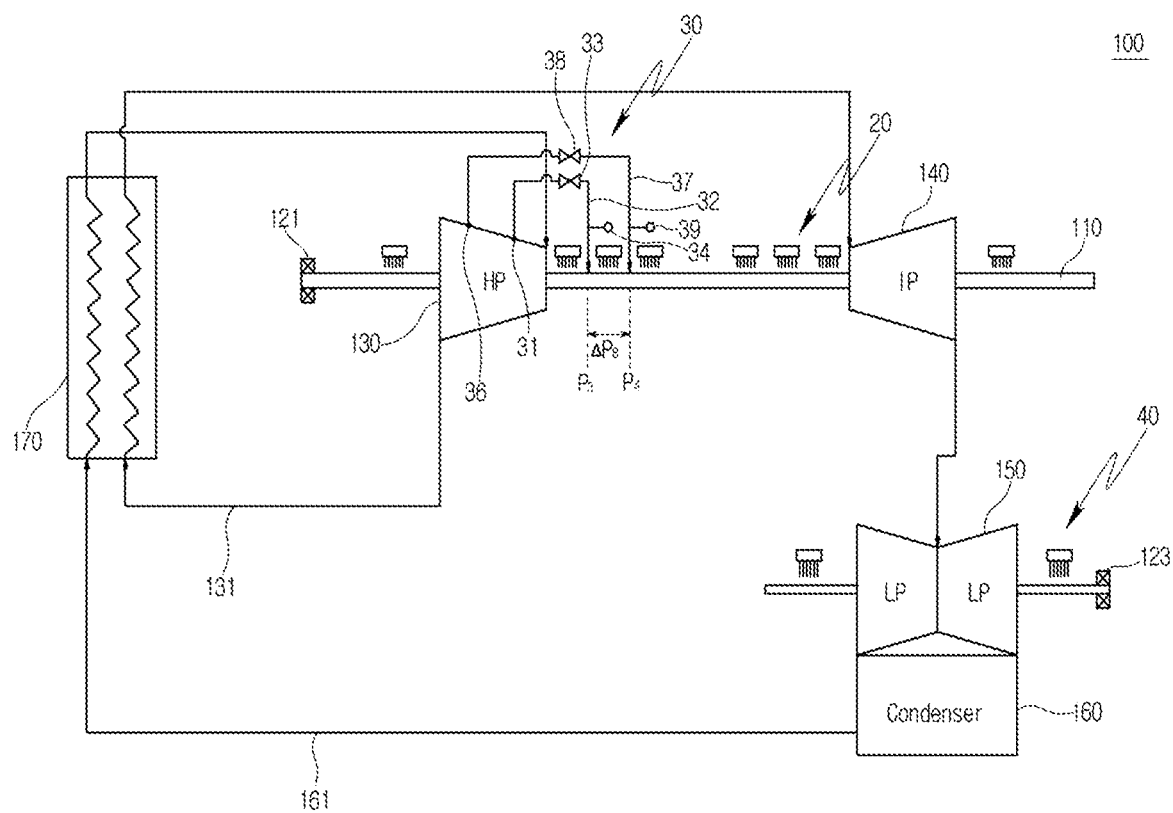

[FIG. 2]
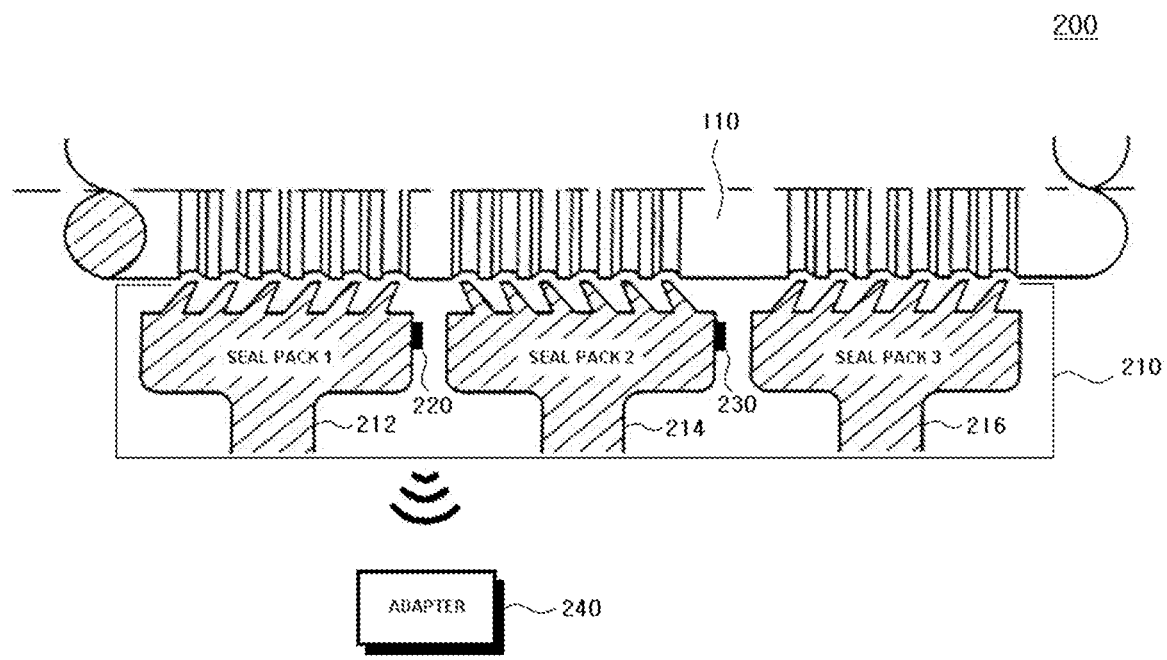

[FIG. 3]
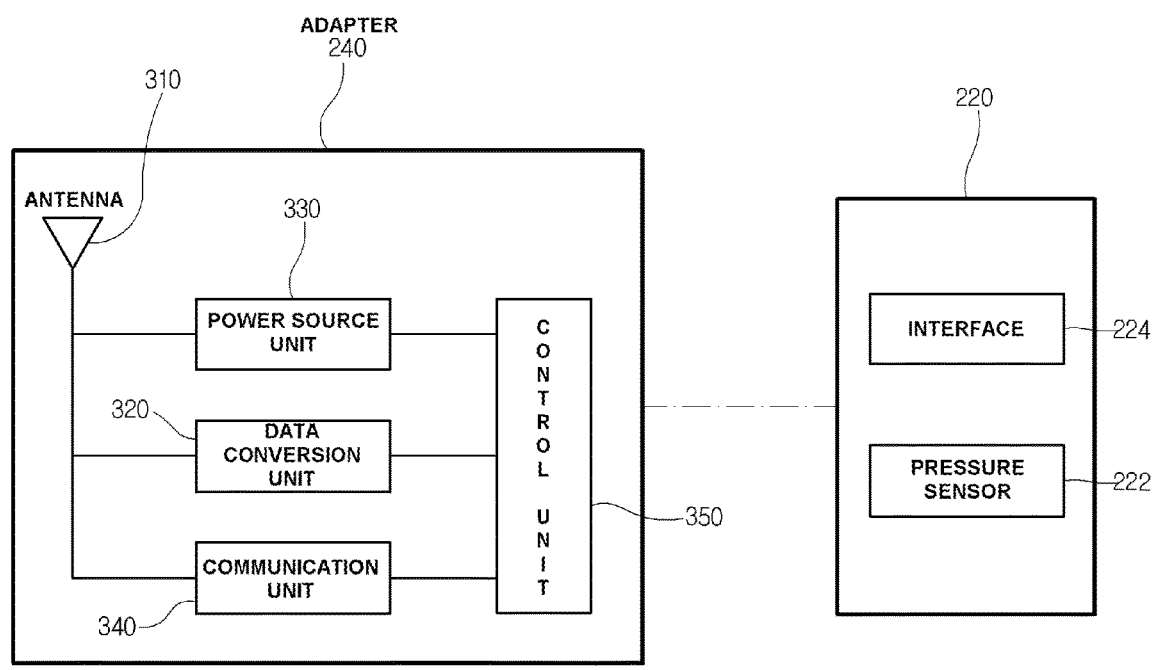

[FIG. 4]
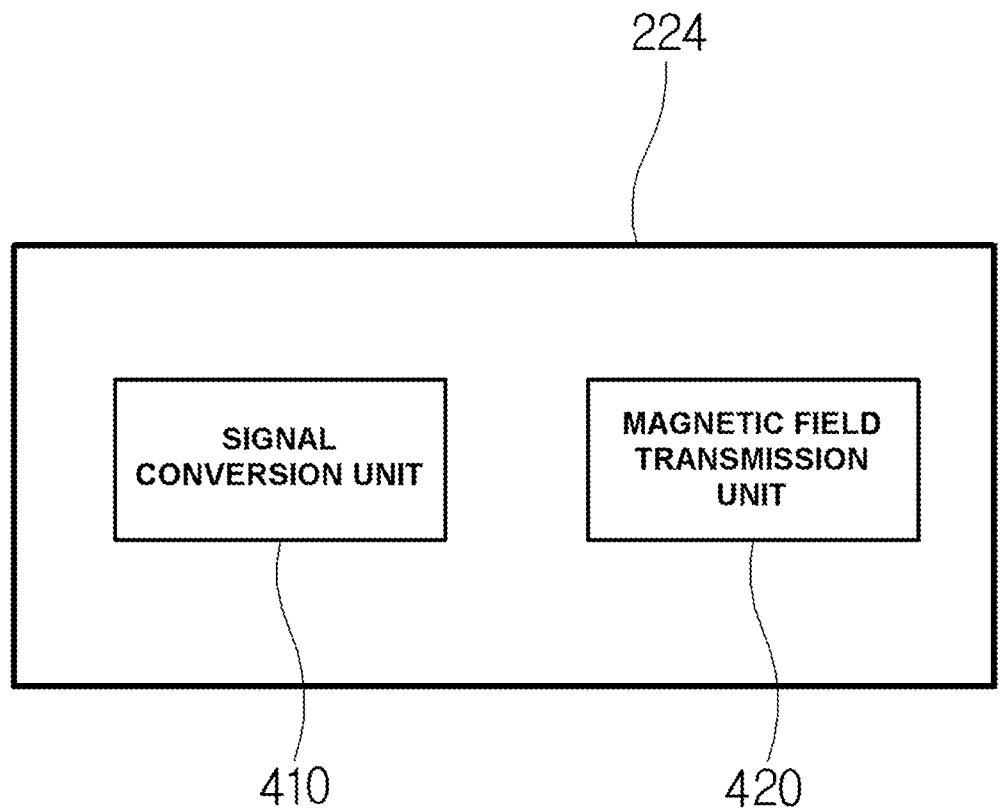

[FIG. 5]
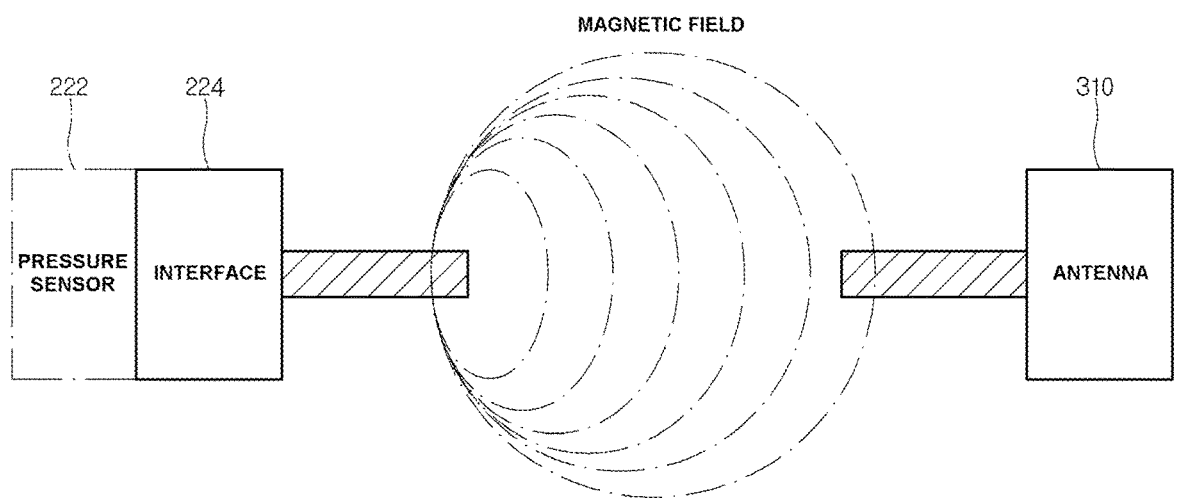

STEAM TURBINE SEAL PACKING PERFORMANCE MONITORING SYSTEM USING MAGNETIC FIELD COMMUNICATION

CROSS-REFERENCE TO RELATED APPLICATIONS

This application claims priority to Korean Patent Application No. 10-2018-0022593, filed on Feb. 26, 2018, the disclosure of which is incorporated herein by reference in its entirety.

BACKGROUND OF THE DISCLOSURE

Field of the Disclosure

The present disclosure relates to a steam turbine seal packing performance monitoring system, and method, using magnetic field communication, and more particularly, to such a system in which steam pressure is measured by installing a pressure sensor inside a seal packing for preventing steam from leaking from a steam turbine, so that pressure information can be transmitted to the outside using magnetic field communication in order to externally monitor seal packing performance.

Description of the Related Art

Generally, a steam turbine generates power by operating a turbine while the steam used for power generation flows into an intermediate pressure turbine through a high pressure turbine and then flows to a condenser through a low pressure turbine.

At this time, a sealing technique for preventing the steam from leaking to the outside, and for preventing external air from flowing into the turbine, is important.

The amount of steam leaked from the steam turbine is a major indicator of overall design and performance evaluation of a seal system, but currently, there is no practical way to measure this amount, or it is difficult to use a flow meter due to a steam and air mixture.

In addition, in order to measure the amount of the steam leaked from the steam turbine, a plurality of flow sensors must be installed outside a sealing unit. However, installation of the plurality of flow sensors is costly.

Further, there is a problem in that when a sealing assembly is broken, it is troublesome to replace the corresponding sealing assembly rapidly, and accordingly, it is not possible to measure the amount of the steam leaked from the corresponding turbine.

SUMMARY OF THE DISCLOSURE

An object of the present disclosure is to provide a steam turbine seal packing performance monitoring system using magnetic field communication, in which steam pressure is measured by installing a pressure sensor inside a seal packing for preventing steam from leaking from a steam turbine, so that pressure information can be transmitted to the outside using magnetic field communication in order to externally monitor seal packing performance. It is a further object of the present disclosure to provide a steam turbine seal packing performance monitoring method using magnetic field communication.

A steam turbine seal packing performance monitoring system according to an embodiment of the present disclosure for achieving the object may include a seal packing unit installed on a rotor shaft of the steam turbine, the seal packing unit including a plurality of seal packs disposed along an axial direction of the rotor shaft; a pressure detection unit installed inside the seal packing unit and configured to detect a pressure of steam leaked from inside the seal packing unit and to transmit a magnetic field signal outside the seal packing unit by converting a detection signal indicative of the detected pressure into the magnetic field signal; and an adapter for receiving the magnetic field signal, converting the received magnetic field signal into pressure data, and calculating a leakage amount of steam based on the pressure data.

The pressure detection unit may be installed between adjacent seal packs among the plurality of seal packs.

The pressure detection unit may be installed in at least one of a steam passage through which steam is discharged from the seal packing unit and an air passage through which air flows into the seal packing unit.

The pressure detection unit may include a pressure sensor for detecting a pressure of the leaked steam and outputting the detection signal; and an interface for transmitting the magnetic field signal outside the seal packing unit by converting the detection signal into the magnetic field signal.

The pressure detection unit may consist of one or more pressure detection units installed inside the seal packing unit and configured to detect the pressure of the leaked steam of at least one seal pack.

The interface may include a signal conversion unit for converting the detection signal into the magnetic field signal; and a magnetic field transmission unit for transmitting the magnetic field signal outside the seal packing unit.

The adapter may be installed outside the seal packing unit.

The adapter may include an antenna for receiving the magnetic field signal; a data conversion unit for converting the received magnetic field signal into the pressure data; a control unit for calculating the leakage amount of the steam based on the pressure data to determine a performance of the seal packing unit; and a communication unit for transmitting warning data generated by the control unit.

The control unit may be configured to determine that steam is leaking from the seal packing unit when a difference between pressure data detected in a previous stage and currently detected pressure data is greater than or equal to a reference value with respect to the determined performance of the seal packing unit.

The control unit may be further configured to control the communication unit to transmit the warning data when it is determined that steam is leaking from the seal packing unit, and wherein the warning data indicates a deterioration in the performance of the seal packing unit.

The control unit may be further configured to determine a replacement cycle of the seal packing unit by comparing the leakage amount of steam with a predetermined reference steam amount.

The control unit may be configured to determine that steam is leaking from at least one seal pack of a first seal pack and a second seal pack when first pressure data is greater than or equal to a reference value. The first pressure data may be detected through a first pressure sensor of one or more pressure sensors respectively attached to downstream sides of the plurality of seal packs, and the first pressure sensor may be provided between the first seal pack and the second seal pack.

The control unit may be further configured to determine that steam is leaking from one seal pack of the first seal pack and the second seal pack when the pressure data detected through pressure sensors other than the first pressure sensor is less than the reference value.

The control unit may be further configured to control the communication unit to transmit a warning message indicating a need to replace the seal pack determined as a seal pack from which the steam is leaking.

The adapter may further include a storage unit for storing steam amount data matched to the pressure data.

According to another aspect of the present disclosure, there is provided a method for monitoring performance of a seal packing in a steam turbine, the steam turbine including a seal packing unit installed on a rotor shaft of the steam turbine, the seal packing unit having a plurality of seal packs disposed along an axial direction of the rotor shaft. The method may include steps of detecting a pressure of steam leaked from the steam turbine; transmitting a magnetic field signal outside the seal packing unit by converting a detection signal for the detected pressure into the magnetic field signal; receiving the magnetic field signal; and converting the magnetic field signal into pressure data, and determining a leakage amount of steam based on the pressure data.

According to the present disclosure, it is possible to prevent air from flowing into the turbine by the seal packing, and to measure leakage of steam from the turbine through pressure sensing.

Therefore, it is possible to monitor the leakage of the steam in real time through the pressure sensor installed inside the seal packing unit in the steam turbine, thus monitoring seal packing performance.

Further, it is possible to calculate the amount of the leakage steam through the pressure difference measurement of the seal packing unit, thus monitoring the performance for the seal packing in real time.

Therefore, it is possible to improve the design of the steam turbine through the quantitative performance measurement of the seal packing.

Other aspects, advantages, and features of the present disclosure will become more apparent on the basis of the following description.

BRIEF DESCRIPTION OF THE DRAWINGS

FIG. 1 is a diagram of a steam turbine to which a seal packing is applied.

FIG. 2 is a diagram of a steam turbine seal packing performance monitoring system using magnetic field communication according to an embodiment of the present disclosure.

FIG. 3 is a block diagram of a pressure detection unit and an adapter for performing magnetic field communication according to an embodiment of the present disclosure.

FIG. 4 is a block diagram of an interface according to an embodiment of the present disclosure.

FIG. 5 is a diagram for illustrating a magnetic field communication between the pressure detection unit and the adapter according to an embodiment of the present disclosure.

DESCRIPTION OF SPECIFIC EMBODIMENTS

Hereinafter, exemplary embodiments of the present disclosure will be described in detail with reference to the accompanying drawings so that those skilled in the art may easily practice the present disclosure. The present disclosure may be implemented in various different forms, and is not limited to the exemplary embodiments described herein.

FIG. 1 illustrates a structure of a steam turbine to which a seal packing is applied.

In FIG. 1, a steam turbine 100 may include a high pressure turbine 130, an intermediate pressure turbine 140, a low pressure turbine 150, a condenser 160, a boiler 170, a first sealing unit 20, a second sealing unit 40, and a sealing pressure adjustment unit 30.

The high pressure turbine 130, the intermediate pressure turbine 140, and the low pressure turbine 150 may be connected to each other by a single rotor shaft 110, and the opposite ends of the rotor shaft 110 may be respectively supported by first and second bearings 121 and 123 to be smoothly rotated.

The high pressure turbine 130 may be operated at a relatively high pressure. The intermediate pressure turbine 140, which is connected to the high pressure turbine 130 by the rotor shaft 110, may receive steam from the high pressure turbine 130 and may be operated at a lower pressure than the high pressure turbine 130. Meanwhile, the low pressure turbine 150, which is connected to the intermediate pressure turbine 140 by the rotor shaft 110, may receive steam from the intermediate pressure turbine 140 and may be operated at a lower pressure than the intermediate pressure turbine 140.

The condenser 160 may be connected to the low pressure turbine 150 and may condense the steam received from the low pressure turbine 150.

The boiler 170 may be interposed between the condenser 160 and the high pressure turbine 130 and may heat the steam received from the condenser 160 to supply the heated steam to the high pressure turbine 130.

In the operation of the steam turbine 100, steam leaks through a minute gap that is created when each turbine is coupled with the rotor shaft 110, or air from the outside flows into the turbine through the gap. Therefore, a sealing technique, such as the first sealing unit 20 and the second sealing unit 40 for preventing air from flowing into the turbine and for preventing leakage of the steam, is crucial.

At this time, the first sealing unit 20 may be disposed on the high pressure turbine 130 and the intermediate pressure turbine 140 along the axial direction of the rotor shaft 110, and may include a seal packing unit (FIG. 2). The second sealing unit 40 may be disposed on the low pressure turbine 150 along the axial direction of the rotor shaft 110, and may include a similar seal packing unit. A detailed configuration of the seal packing unit will be described later.

The sealing pressure adjustment unit 30 may adjust a pressure difference between opposite sides of a seal pack (described later) included in the first sealing unit 20 by bleeding the steam of the high pressure turbine 130 so that the first sealing unit 20 may be properly disposed. The sealing pressure adjustment unit 30 may include a first bleeding line 32, a second bleeding line 37, a first control valve 33, a second control valve 38, a first pressure sensor 34, and a second pressure sensor 39.

The first bleeding line 32 may connect a first bleeding unit 31 of the high pressure turbine 130 with the downstream side of one seal pack of the first sealing unit 20. The second bleeding line 37 may connect a second bleeding unit 36, forming a pressure different from that of the first bleeding unit 31 of the high pressure turbine 130, with the downstream side of an adjacent seal pack of the first sealing unit 20.

The first control valve 33 may be disposed on the first bleeding line 32 and may be provided to control the opening and closing of the first bleeding line 32. The second control valve 38 may be disposed on the second bleeding line 37 and may be provided to control the opening and closing of the second bleeding line 37.

The first pressure sensor 34 may be disposed on the first bleeding line 32 and may be provided to measure a pressure $P_3$ at the downstream side of the one seal pack of the first sealing unit 20. The second pressure sensor 39 may be disposed on the second bleeding line 37 and may be provided to measure a pressure $P_4$ at the downstream side of the adjacent seal pack of the first sealing unit 20.

When the first and second pressure sensors 34 and 39 measure the pressures $P_3$, $P_4$ at the downstream sides of two adjacent seal packs of the first sealing unit 20, respectively, a control unit (FIG. 3) determines a pressure difference $\Delta P_B$. In order for the first sealing unit 20 to be disposed properly, the pressure difference $\Delta P_B$ should be less than or equal to a certain pressure value. If the pressure difference $\Delta P_B$ exceeds a pressure value capable of maintaining the first sealing unit 20, damage may occur or the sealing ability may not be exerted properly.

FIG. 2 illustrates the overall configuration of a steam turbine seal packing performance monitoring system using magnetic field communication according to an embodiment of the present disclosure.

Referring to FIGS. 1 and 2, a steam turbine seal packing performance monitoring system 200 according to an embodiment of the present disclosure may include a seal packing unit 210, pressure detection units 220 and 230, and an adapter 240.

The seal packing unit 210 may be included in the second sealing unit 40 in the low pressure turbine 150 and a plurality of seal packs 212, 214, and 216 may be disposed along the axial direction of the rotor shaft 110 that is one configuration of the turbine.

The plurality of seal packs 212, 214, and 216 may each include a labyrinth seal that reduces the leakage amount of steam, whereby the steam undergoes a pressure drop each of the several times it passes through a narrow gap. That is, each of the seal packs 212, 214, and 216 may have a sawtooth configuration facing the outer surface of the rotor shaft 110, and a corresponding outer surface of the rotor shaft 110 may have grooves arranged in correspondence with the respective saw teeth. In another example, instead of the labyrinth seal, the plurality of seal packs 212, 214, and 216 may each include a honeycomb seal or a brush seal assembly. The plurality of seal packs 212, 214, and 216 may include a first seal pack 212, a second seal pack 214, and a third seal pack 216.

The pressure detection units 220 and 230 may be installed inside the seal packing unit 210 to detect the pressure of the steam leaked from the low pressure turbine 150 and to output a detection signal indicative of the detected pressure. In doing so, the pressure detection units 220 and 230 convert the detection signal into a magnetic field signal, which is transmitted to the outside of the seal packing unit 210. Specifically, the pressure detection units 220 and 230 may transmit the detection signal for pressure to the adapter 240 disposed outside the seal packing unit 210.

The pressure detection units 220 and 230 may be installed between adjacent seal packs of the plurality of the seal packs 212, 214 and 216 through which the steam is discharged from the inside of the seal packing unit 210. Preferably, in order to detect (or measure) a pressure between two adjacent seal packs of the plurality of the seal packs 212, 214 and 216, the pressure detection units 220 and 230 are respectively installed on the downstream side of each of the two adjacent seal packs. The pressure detection units 220 and 230 may include a first pressure detection unit 220 and a second pressure detection unit 230. Although FIG. 2 illustrates the first pressure detection unit 220 installed between the adjacent first and second seal packs 212 and 214 and the second pressure detection unit 230 installed between the adjacent second and third seal packs 214 and 216, the present disclosure is not limited to this installation. When the seal packs number more than three, the pressure detection units may additionally include third through nth pressure detection units respectively installed between adjacent seal packs.

In addition, the pressure detection units 220 and 230 may be installed in a passage through which steam is discharged from the inside of the seal packing unit 210 or a passage through which steam flows into the seal packing unit 210 from the outside. The pressure detection units 220 and 230 may be coated with a ceramic material capable of withstanding temperatures as high as about 500° C.

The adapter 240 may receive a magnetic field signal transmitted by either of the pressure detection units 220 and 230, and may convert the received magnetic field signal into pressure data. The adapter 240 may calculate the leakage amount of the steam based on the pressure data. The adapter 240 may be installed outside the seal packing unit 210.

FIG. 3 illustrates the internal configurations of a pressure detection unit and an adapter for performing magnetic field communication according to an embodiment of the present disclosure, and FIG. 4 illustrates an internal configuration of an interface of FIG. 3.

Referring to FIGS. 2 to 4, the first pressure detection unit 220 may include a pressure sensor 222 for detecting a pressure of steam leaked from the low pressure turbine 150 and an interface 224 for transmitting a magnetic field signal to the outside of the seal packing unit 210 by converting a detection signal detected by the pressure sensor 222 into the magnetic field signal. The second pressure detection unit 230 may include a pressure sensor (not illustrated) and an interface (not illustrated) having the same function as those of the first pressure detection unit 220.

The interface 224 may be disposed to be adjacent to the pressure sensor 222 inside the first pressure detection unit 220, and may transmit the magnetic field signal to the outside of the seal packing unit 210 by converting the detection signal for the pressure detected by the pressure sensor 222 into the magnetic field signal. Alternative configurations of the interface 224 include its disposition inside the seal packing unit 210 to be separate from the pressure sensor 222, and a configuration in which the interface 224 is unified with the pressure sensor 222.

The interface 224 may include a signal conversion unit 410 and a magnetic field transmission unit 420. The signal conversion unit 410 may convert the detection signal for the pressure of the steam detected by the pressure sensor 222 into the magnetic field signal, and the magnetic field transmission unit 420 may transmit the magnetic field signal to the outside of the seal packing unit 210.

The magnetic field communication between the interface 224 and the adapter 240 may set the interface 224 and the adapter 240 to have the same resonance frequency, for transmitting maximum power. Maximum power transmission may be further aided by setting a specific distance between the interface 224 and the adapter 240 or by setting specific locations of the interface 224 and the adapter 240.

The adapter 240 may include an antenna 310, a data conversion unit 320, a power source unit 330, a communication unit 340, and a control unit 350. Although not specifically illustrated in FIG. 3, the adapter 240 may further include a storage unit for storing steam amount data matched to the pressure data.

The antenna 310 may receive the magnetic field signal from the interface 224 to transmit the received signal to the data conversion unit 320.

The data conversion unit 320 may convert the magnetic field signal transmitted from the antenna 310 into the pressure data in a digital format. That is, the data conversion unit 320 may perform a function of a magnetic field reception unit for receiving the magnetic field signal, and may convert the received magnetic field signal into the pressure data in a digital format.

The power source unit 330 may include a power source generated using the magnetic field signal, and may store the generated power of the source.

Specifically, the power source unit 330 may include a coil (not shown) capable of generating a current and a capacitor (not shown) capable of storing the generated current when a magnetic field is applied. In receiving the magnetic field signal, the power source unit 330 stores the current generated by an electromagnetic induction phenomenon caused by the magnetic field in the capacitor. The capacitor may use the stored current of the capacitor as a power source when current is no longer being supplied. Therefore, when the magnetic field signal is applied from the antenna 310, the power source unit 330 may store the current generated by the magnetic field signal in the capacitor, and when the magnetic field signal is not supplied from the antenna 310 such that current is no longer supplied to the capacitor, the power source unit 330 may use the current stored in the capacitor as a power source. Although not specifically illustrated in FIG. 3, the power source unit 330 may further include a DC-DC converter for converting a current generated by a magnetic field signal into a DC current, and a harvester rectifier for removing and rectifying a pulsation component in the DC current.

The communication unit 340 may convert the data generated by the control unit 350 into a transmission signal to be transmitted to the outside. The transmission may be made to the outside of the turbine and may include transmission to a device (e.g., a computer, a terminal, etc.) capable of processing the data generated by the control unit 350.

The control unit 350 may be a main control unit (MCU) operating with 16-bit ultra-low-power, and may calculate the leakage amount of the steam based on the pressure data to determine performance of the seal packing unit 210. That is, the control unit 350 may determine that steam is leaking from the seal packing unit 210 when a difference ΔP between the pressure data detected in a previous stage and the currently detected pressure data is greater than or equal to a reference value.

The reference value for the pressure difference ΔP may be 0.5 bar, for example. Therefore, when the difference between the pressure data detected in the previous (last) stage and the currently detected pressure data ΔP (last-stage pressure—the pressure inside the seal packing) is 0.7 bar, the difference exceeds the reference value of 0.5 bar, such that the control unit 350 determines that steam is leaking from the seal packing unit 210. Here, the difference value is merely an example. Therefore, the control unit 350 may monitor the amount of the leakage steam of the seal packing unit 210 in real time. At this time, the pressure data in the previous stage (last stage pressure) may exist as a matching design value.

In addition, when it is determined that steam is leaking from the seal packing unit 210, the control unit 350 may transmit warning data to the outside to indicate a deterioration in the performance of the seal packing unit 210.

In addition, the control unit 350 may determine a replacement cycle of the seal packing unit 210 by comparing the amount of the leaked steam with a predetermined reference steam amount. That is, when the amount of the leaked steam exceeds the predetermined reference steam amount, the control unit 350 may determine that the performance of the seal packing unit 210 has deteriorated and may generate a warning message indicating that the corresponding seal pack should be replaced. The control unit 350 may transmit the warning message to an external (management) device or to a manager's terminal through the communication unit 340.

In addition, the control unit 350 may determine that steam is leaking from at least one seal pack of the first seal pack 212 and the second seal pack 214 when first pressure data is greater than or equal to the reference value. Here, the first pressure data is data detected through the first pressure detection unit 220, which is installed between the first and second seal packs 212 and 214. That is, the control unit 350 may determine that steam is leaking from the first seal pack 212 to which the first pressure detection unit 220 is attached.

At this time, when the pressure data detected through a pressure detection unit other than the first pressure detection unit 220 is less than the reference value, the control unit 350 may determine that steam is leaking from one or the other of the first and second seal packs 212 and 214. That is, since the pressure detection units other than the first pressure detection unit 220 detect pressure data that is less than the reference value, the control unit 350 may determine that seal packs adjacent to the other pressure detection units normally operate without leakage of steam.

When the pressure data detected by the first pressure detection unit 220 is greater than or equal to the reference value and the pressure data detected by the second pressure detection unit 230 is less than the reference value, the first pressure detection unit 220 has been installed between the first seal pack 212 and the second seal pack 214, such that it may be determined that steam is leaking from the first seal pack 212.

Then, when it is determined that steam is leaking from the first seal pack 212 or the second seal pack 214, the control unit 350 may transmit to the outside a warning message indicating the need to replace the seal pack from which it has been determined that steam is leaking.

Meanwhile, the control unit 350 may control an energy harvesting function using the magnetic field signal. That is, when the power source unit 330 is not charged, the control unit 350 supplies the magnetic field signal to the power source unit 330 until its charge reaches a first capacity. The control unit 350 may not analyze the magnetic field signal until the first capacity is reached. At this time, the power source unit 330 generates power using the magnetic field signal supplied from the antenna 310 according to a control of the control unit 350 and may store the generated power internally in, for example, a battery or capacitor provided in the power source unit 330. For example, the first capacity may be a capacity in which charging of the power source unit 330 has been completed, or may be a capacity of the extent that may analyze the magnetic field signal even if charging of the power source unit 330 has been not completed.

When the charging of the power source charged in the power source unit 330 reaches the first capacity, the control unit 350 no longer supplies the magnetic field signal to the power source unit 330, and analyzes the magnetic field signal to use it for determining the state inside a bearing. At this time, the control unit 350 may receive a power source from the power source unit 330 to analyze an internal state of the seal packing unit 210.

In addition, the charging of the power source unit 330 has been completed, and then when the power source stored in the power source unit 330 is reduced to a second capacity or less, the control unit 350 supplies the magnetic field signal to the power source unit 330 again. At this time, the control unit 350 may control to supply all of the magnetic field signals to the power source unit 330 to generate a power source without using the magnetic field signal for analyzing the internal pressure state of the seal packing unit 210. For example, the second capacity may be a capacity in which all power stored in the power source unit 330 has been discharged, and even if the power stored in the power source unit 330 has not been fully discharged, the second capacity is a capacity of a level prohibiting analysis of the magnetic field signal.

Here, the control unit 350 may supply the magnetic field signal so that the capacity of the power source stored in the power source unit 330 is greater than or equal to the first capacity, and when the capacity of the power source stored in the power source unit 330 reaches the first capacity, the control unit 350 may analyze the magnetic field signal delivered from the antenna 310 using the stored power source. In addition, when the capacity of the power source stored in the power source unit 330 reduces to the second capacity or less, the control unit 350 may supply the magnetic field signal received from the antenna 310 to the power source unit 330 again. That is, the control unit 350 may determine the internal state of the seal packing unit 210 without a separate power source device. Then, the control unit 350 provides the communication unit 340 with the analyzed result of the magnetic field signal.

The communication unit 340 transmits the result that has analyzed the magnetic field signal in the control unit 350 to separate communication equipment. At this time, the communication unit 340 may transmit the analyzed result to the separate communication equipment using a magnetic field. The separate communication equipment may be the pressure detection unit 220 or equipment other than the pressure detection unit 220.

Although not specifically illustrated in FIG. 3, the communication unit 340 may further include a balanced modulator-demodulator (modem) for modulating data to be transmitted and demodulating a received signal.

FIG. 5 illustrates the magnetic field communication between a pressure detection unit and an adapter according to an embodiment of the present disclosure.

Referring to FIG. 5, the pressure sensor 222 measures the pressure of the steam flowing into the seal packing unit 210 from the turbine, and the interface 224 converts the detection signal indicating the internal pressure state of the seal packing unit 210 measured in the pressure sensor 222 into a magnetic field signal. In addition, the interface 224 transmits the magnetic field signal to the antenna 310 of the adapter 240 through the magnetic field. At this time, the interface 224 may include a separate passive element for impedance matching with the adapter 240. Here, the antenna 310 may receive the magnetic field signal transmitted from the interface 224 to deliver it to the data conversion unit 320.

In the magnetic field communication between the interface 224 and the antenna 310, the interface 224 and the antenna 310 may be set to have the same resonance frequency, and the distance and locations of the interface 224 and the antenna 310 may be set to be disposed at a specific distance or specific locations so that the maximum power is transmitted. That is, it is possible to enhance the reception performance of the magnetic field communication through the impedance matching between the adapter 240 and the pressure detection unit 220.

As described above, according to the present disclosure, it is possible to achieve the steam turbine seal packing performance monitoring system using magnetic field communication, which may install the pressure sensor inside the seal packing for preventing steam from being leaked to the outside from the steam turbine for rotating the turbine with steam to generate power, and to thereby measure the steam pressure in order to transmit the information to the outside through the magnetic field communication, thus monitoring seal packing performance.

Those skilled in the art to which the present disclosure pertains will understand that the present disclosure may be implemented in other various forms without departing from the technical spirit or essential characteristics of the present disclosure, so the aforementioned embodiments should not be construed as being limitative. The scope of the present disclosure is disclosed in the following claims rather than the detailed description, and it should be understood that all modifications or variations derived from the meanings and scope of the appended claims and equivalents thereof.

What is claimed is:

1. A system for monitoring performance of a seal packing in a steam turbine, the system comprising:
   a seal packing unit installed on a rotor shaft of the steam turbine, the seal packing unit including a plurality of seal packs disposed along an outer surface of the rotor shaft;
   a pressure detection unit installed inside the seal packing unit between adjacent seal packs among the plurality of seal packs and configured to detect a pressure of steam leaked from inside the seal packing unit and to transmit a magnetic field signal outside the seal packing unit by converting a detection signal indicative of the detected pressure into the magnetic field signal; and
   an adapter for receiving the magnetic field signal, converting the received magnetic field signal into pressure data, and calculating a leakage amount of steam based on the pressure data.

2. The system of claim 1, wherein the pressure detection unit is installed in a steam passage through which the steam is discharged from the inside of the seal packing unit.

3. The system of claim 1, wherein the pressure detection unit is installed in an air passage through which air flows into the seal packing unit.

4. The system of claim 1, wherein the pressure detection unit comprises:
   a pressure sensor for detecting a pressure of the leaked steam and outputting the detection signal; and
   an interface for transmitting the magnetic field signal outside the seal packing unit by converting the detection signal into the magnetic field signal.

5. The system of claim 4, wherein the pressure detection unit consists of one or more pressure detection units installed inside the seal packing unit and configured to detect the pressure of the leaked steam of at least one seal pack.

6. The system of claim 4, wherein the interface comprises:
   a signal conversion unit for converting the detection signal into the magnetic field signal; and
   a magnetic field transmission unit for transmitting the magnetic field signal outside the seal packing unit.

7. The system of claim 1, wherein the adapter is installed outside the seal packing unit.

8. The system of claim 1, wherein the adapter comprises:
an antenna for receiving the magnetic field signal;
a data conversion unit for converting the received magnetic field signal into the pressure data;
a control unit for calculating the leakage amount of the steam based on the pressure data to determine a performance of the seal packing unit; and
a communication unit for transmitting warning data generated by the control unit.

9. The system of claim 8, wherein the control unit is configured to determine that steam is leaking from the seal packing unit when a difference between pressure data detected in a previous stage and currently detected pressure data is greater than or equal to a reference value with respect to the determined performance of the seal packing unit.

10. The system of claim 9, wherein the control unit is further configured to control the communication unit to transmit the warning data when it is determined that steam is leaking from the seal packing unit, and wherein the warning data indicates a deterioration in the performance of the seal packing unit.

11. The system of claim 9, wherein the control unit is further configured to determine a replacement cycle of the seal packing unit by comparing the leakage amount of steam with a predetermined reference steam amount.

12. The system of claim 8,
wherein the control unit is configured to determine that steam is leaking from at least one seal pack of a first seal pack and a second seal pack when first pressure data is greater than or equal to a reference value;
wherein the first pressure data is detected through a first pressure sensor of one or more pressure sensors respectively attached to downstream sides of the plurality of seal packs; and
wherein the first pressure sensor is provided between the first seal pack and the second seal pack.

13. The system of claim 12, wherein the control unit is further configured to determine that steam is leaking from one seal pack of the first seal pack and the second seal pack when the pressure data detected through pressure sensors other than the first pressure sensor is less than the reference value.

14. The system of claim 12, wherein the control unit is further configured to control the communication unit to transmit a warning message indicating a need to replace the seal pack determined as a seal pack from which the steam is leaking.

15. The system of claim 8, wherein the adapter further comprises a storage unit for storing steam amount data matched to the pressure data.

16. A method for monitoring performance of a seal packing in a steam turbine, the steam turbine including a seal packing unit installed on a rotor shaft of the steam turbine, the seal packing unit having a plurality of seal packs disposed along an outer surface of the rotor shaft, the method comprising:
detecting a pressure of steam leaked from the steam turbine between adjacent seal packs among the plurality of seal packs;
transmitting a magnetic field signal outside the seal packing unit by converting a detection signal for the detected pressure into the magnetic field signal;
receiving the magnetic field signal; and
converting the magnetic field signal into pressure data, and determining a leakage amount of steam based on the pressure data.

17. The method of claim 16, further comprising determining a replacement cycle of the seal packing unit by comparing the leakage amount with a predetermined reference steam amount.

18. The method of claim 16, further comprising:
determining that steam is leaking from at least one seal pack of a first seal pack and a second seal pack when first pressure data is greater than or equal to a reference value,
wherein the first pressure data is detected through a first pressure sensor of one or more pressure sensors respectively attached to downstream sides of the plurality of seal packs, and
wherein the first pressure sensor is provided between the first seal pack and the second seal pack.

19. The method of claim 18, further comprising determining that steam is leaking from one seal pack of the first seal pack and the second seal pack when the pressure data detected through pressure sensors other than the first pressure sensor is less than the reference value.

20. The method of claim 18, further comprising transmitting a warning message indicating a need to replace the seal pack determined as a seal pack from which the steam is leaking.

* * * * *